Nov. 28, 1967     E. C. SWANSON     3,354,917
CONSTANT VOLUME, VACUUM-AIR, LIQUID IMPREGNATING DISPENSER
Filed Jan. 6, 1964     3 Sheets-Sheet 1

INVENTOR.
EDWARD C. SWANSON
BY
ATTORNEY

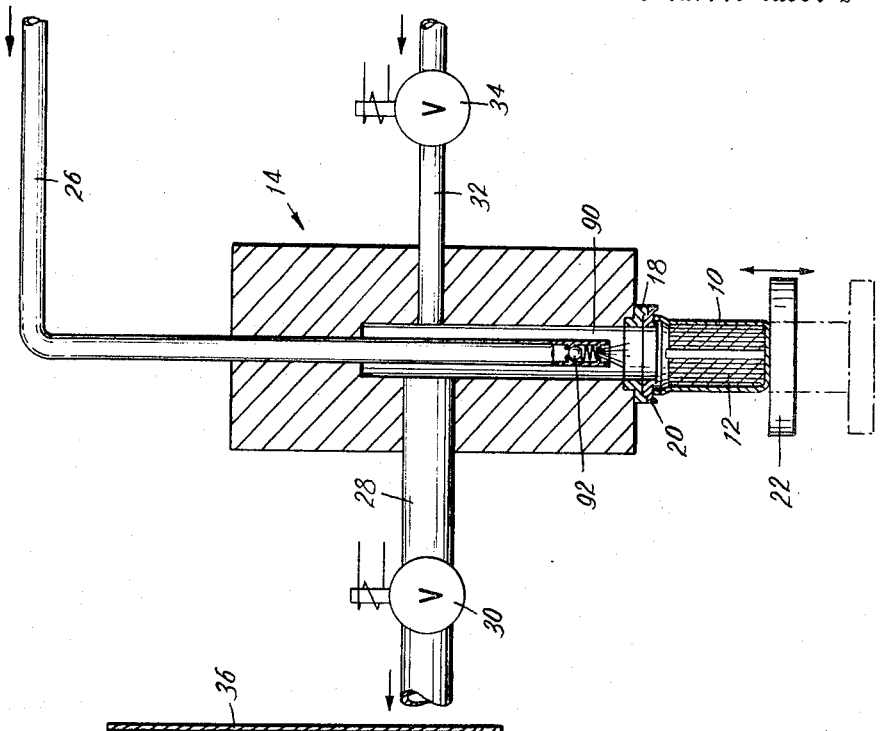
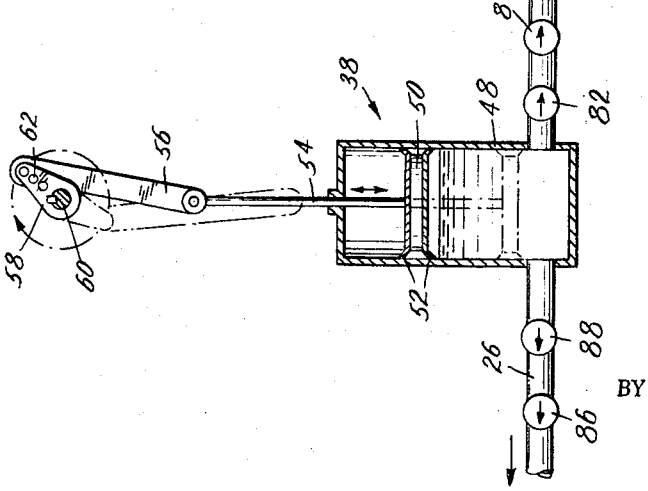

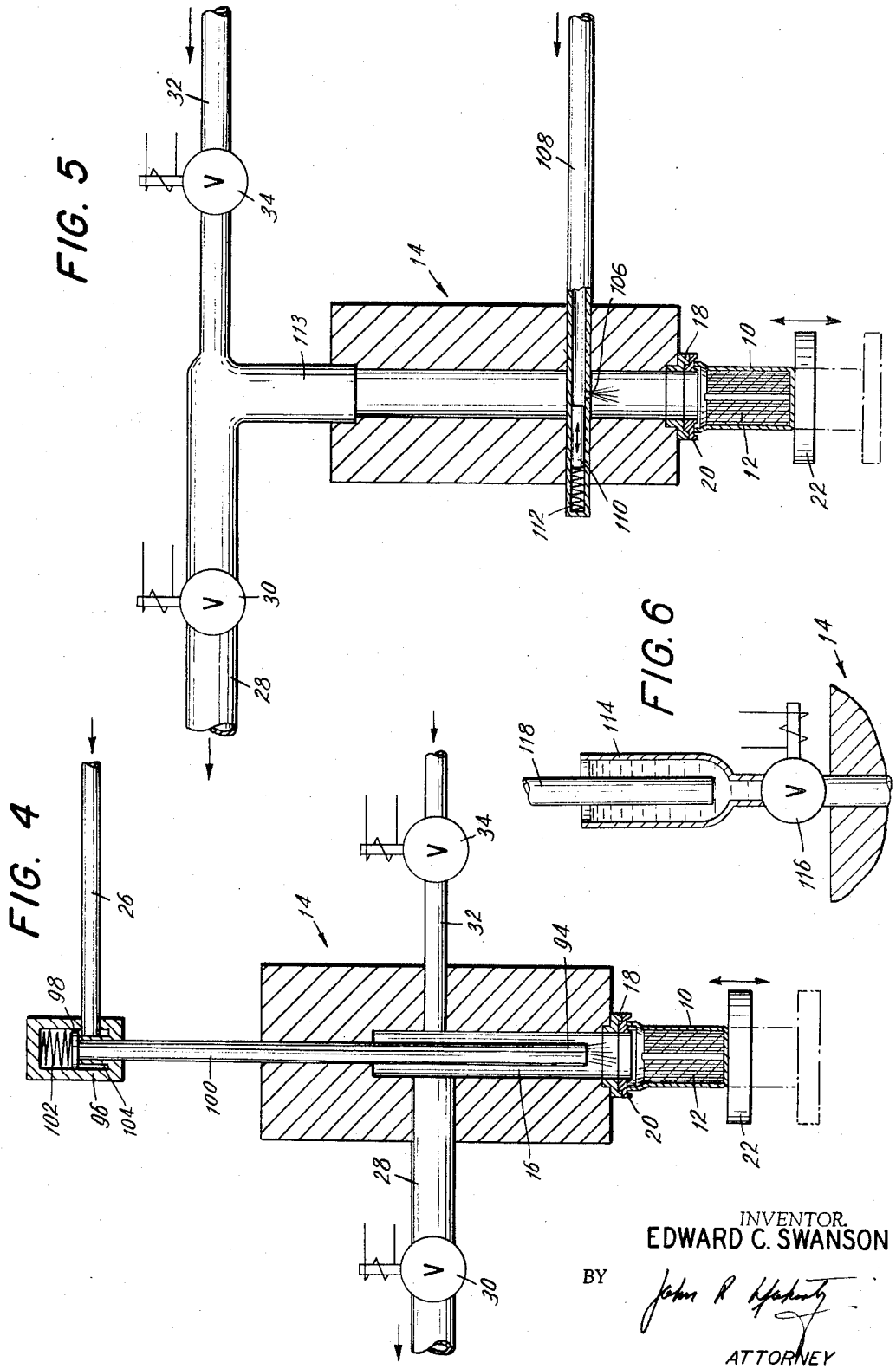

United States Patent Office 3,354,917
Patented Nov. 28, 1967

3,354,917
CONSTANT VOLUME, VACUUM-AIR, LIQUID IMPREGNATING DISPENSER
Edward C. Swanson, Cleveland, Ohio, assignor to Union Carbide Corporation, a corporation of New York
Filed Jan. 6, 1964, Ser. No. 335,917
3 Claims. (Cl. 141—54)

This invention relates to the dispensing of liquids, and more particularly to an apparatus for dispensing a predetermined and uniform amount of liquid into a container, the volume of which is substantially filled by a porous mass, and for uniformly impregnating the porous mass with the liquid.

Such conditions are encountered, for example, in the dispensing of a liquid electrolyte into the container of an alkaline type galvanic cell during manufacture. Usually, this type of galvanic cell employs a porous electrode unit, suitably in the form of a so-called "jelly roll," which is disposed in the container, preferably under a high physical pressure, and which substantially fills the volume of the container. Prior to sealing the cell, the porous electrode unit is thoroughly impregnated with the liquid electrolyte, such as a solution of sodium hydroxide. Because the electrolyte solution is limited in amount to that required to produce a moist rather than a wet cell, it is essential that the liquid electrolyte be uniformly distributed throughout the porous electrode unit.

It is the primary object of the invention to provide a method and liquid dispenser whereby a predetermined and uniform amount of liquid can be dispensed into a container which is substantially filled with a porous mass and whereby the porous mass can be uniformly impregnated with the liquid.

The above and other objects are achieved by the novel features of the liquid dispenser of the invention which comprises, in combination, a liquid dispensing manifold forming a vacuum chamber therein and including means for tightly sealing the open end of the container to the bottom of the vacuum chamber, and a liquid pump for delivering the liquid to be dispensed into the vacuum chamber and to the container from any convenient source, such as from a liquid reservoir. The liquid dispensing manifold also includes a distributing nozzle disposed in the vacuum chamber for depositing the liquid onto the top of the porous mass to be impregnated in the container. Suitable means are provided for evacuating the vacuum chamber prior to depositing the liquid onto the top of the porous mass and for introducing air into the chamber under pressure after depositing the liquid in order to force the liquid uniformly into all portions of the porous mass in the container.

In the preferred embodiment of the invention, the liquid pump is of the positive displacement type and is capable of delivering a predetermined and uniform amount of liquid from the reservoir to the distributing nozzle in the vacuum chamber. The liquid pump may be provided with an adjustable plunger stroke so that the amount of liquid to be delivered can be easily regulated.

Several different arrangements of the liquid delivery system, including the liquid pump, may be used in the practice of the invention. In one arrangement, the liquid pump may be employed in conjunction with a slide valve for feeding the liquid from the reservoir to the pump in one position and for delivering the liquid to the distributing nozzle in another position during the exhaust stroke of the pump. Valve means are disposed in the liquid delivery system in order to prevent back pressure through the system and into the slide valve and pump when air is introduced into the vacuum chamber after the liquid is deposited. The liquid pump may also be used with an arrangement of check valves which permit the flow of liquid only in the direction from the reservoir to the pump, and from the pump to the distributing nozzle in the vacuum chamber.

In another embodiment of the invention, the liquid may be delivered to the distributing nozzle in the vacuum chamber from an external metered reservoir located at the top of the liquid dispensing manifold. The metered reservoir is adapted to contain the desired uniform volume of liquid to be dispensed and is used in conjunction with valve means for feeding the liquid to the distributing nozzle, suitably by atmospheric pressure. The liquid may be supplied to the metered reservoir from any convenient source, such as from the main liquid reservoir by means of a pump, for example. This arrangement offers the advantage in that the metered reservoir may be made transparent and the desired amount of liquid to be dispensed visually observed during the dispensing operation.

For the sake of clarity, the invention will now be described in more detail as applied to the dispensing of a liquid electrolyte, such as a solution of sodium hydroxide, into the container of an alkaline type galvanic cell prior to hermetically sealing the cell, the container being substantially filled by a porous electrode unit which is to be uniformly impregnated with the liquid electrolyte. Of course, it will be understood that the invention is not limited to this particular application and that the principles thereof may be used in any type of installation where it is desirable to not only dispense a predetermined and uniform amount of liquid into a container but also to uniformly impregnate a porous mass disposed in the container. In order to fully describe the invention, reference will be had to the accompanying drawings, in which:

FIGURE 2 is a similar view of a portion of the liquid dispenser illustrating a different valve arrangement in the liquid delivery system therefor;

FIGURE 3 is an elevational view, partially in section, of the dispensing manifold illustrating a distributing nozzle incorporating valve means therein;

FIGURE 4 is a view similar to FIGURE 3 but illustrating a different form of distributing nozzle and valve means for the dispenser;

FIGURE 5 is a similar view illustrating another type of distributing nozzle incorporating valve means therein; and FIGURE 6 is a fragmentary view of the liquid dispenser illustrating a different arrangement of the liquid delivery system therefor.

Figure 1:
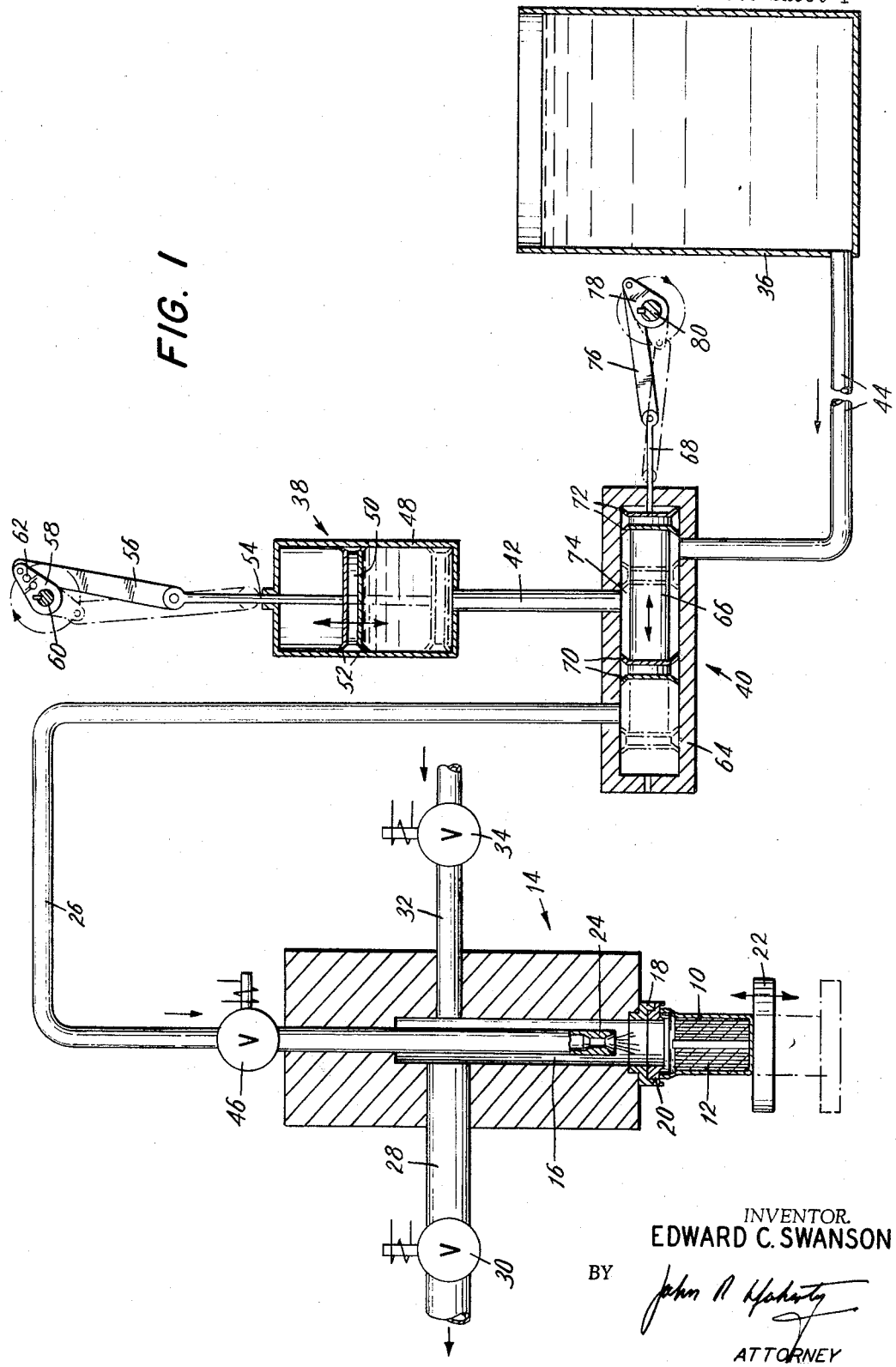
FIGURE 1 is a schematic view, partially in section, of a typical liquid dispenser embodying the invention.

Referring to FIGURE 1 of the drawings, there is illustrated schematically a typical liquid dispenser embodying the invention and which may be used in the dispensing of a predetermined and uniform amount of liquid electrolyte, e.g., sodium hydroxide, into an alkaline type galvanic cell container 10. As indicated by the reference numeral 12, a porous electrode unit to be uniformly impregnated with the liquid electrolyte is disposed within the container 10.

Dispensing manifold 14 is provided for distributing the liquid electrolyte into the container 10. The manifold 14 has a vacuum chamber 16 formed therein and has a bottom open end to which the container 10 is mounted. Within the bottom end of the manifold 14 is provided a seal bushing 18 which carries a gasket 20 for sealing the open end of the container 10. Suitably, the container 10 is supported on a movable platform 22 which may be raised and lowered during the dispensing operation, as indicated by the arrows and dotted lines in the drawings.

A distributing nozzle 24 is mounted in the vacuum chamber 16 for depositing the liquid electrolyte onto the top of the porous electrode unit 12 in the container 10.

The distributing nozzle 24 is of the restriction orifice type and communicates with a conduit 26 extending through the top of the manifold 14. Means including a conduit 28 and a solenoid valve 30 are provided for evacuating the chamber 16. Similar means including a conduit 32 and a solenoid valve 34 are provided for introducing air under pressure into the chamber 16 after the liquid electrolyte is deposited onto the top of the porous electrode unit 12.

Liquid electrolyte to be dispensed is stored in a reservoir tank 36. From the tank 36, the liquid electrolyte is passed to the dispensing manifold 14 through means of a liquid delivery system comprising a positive displacement pump 38 and a slide valve 40, both of which communicate through a conduit 42. The liquid electrolyte is fed from the bottom of the reservoir tank 36, suitably by gravity, through a conduit 44 to the inlet of the slide valve 40, and thence to the pump 38 as will hereinafter be described in more detail. During the exhaust stroke of the pump 38, the liquid electrolyte is fed from the outlet of the slide valve 40 through the conduit 26 to the distributing nozzle 24 in the dispensing manifold 14. A solenoid valve 46 is provided in the conduit 26 in order to prevent back pressure into the slide valve 40 and pump 38 when air is introduced through the conduit 32 into the vacuum chamber 16.

The positive displacement pump 38 comprises an outer casing 48 having a movable piston 50 therein provided with piston seals 52 and a piston rod 54. To actuate the piston 50 a linkage mechanism is provided including a first linkage arm 56 connected to the piston rod 54 and to a second linkage arm 58 which is mounted on a drive shaft 60. Suitably, the linkage arm 58 may be provided with a series of bolt holes 62 along its length for attachment of the first linkage arm 56 in any of several different positions, whereby the effective length of the linkage mechanism, and consequently the piston stroke, may be regulated.

The slide valve 40 comprises an outer casing 64 having an elongated movable piston 66 slidably mounted therein and a piston rod 68. The piston 66 is provided with piston seals 70, 72, respectively at each end, and has a diameter which is slightly smaller than that of the casing 64, defining an annular passage 74 therebetween. To actuate the piston 66 a linkage mechanism similar to that for the pump 38 is provided. This linkage mechanism includes a first linkage arm 76 connected to the piston rod 68 and to a second linkage arm 78 which is mounted on a drive shaft 80.

In the position of the slide valve 40 shown in FIGURE 1, the liquid electrolyte fed from the tank 36 via the conduit 44 is passed into the annular passage 74 defined by the movable piston 66 and is then drawn through the conduit 42 into the pump 38 during its intake stroke. When the pump 38 reaches the top of its intake stroke, the piston 66 is actuated through the linkage mechanism driven by the shaft 80 and is moved to its other position shown by the dotted lines in FIGURE 1. In this position, the piston 66 blocks the further passage of the liquid electrolyte into the pump 38 and permits liquid flow through the annular passage 74 into the conduit 26 during the exhaust stroke of the pump 38. Preferably, both linkage mechanisms for the pump 38 and the slide valve 40 are driven from a common power source, such as an electric motor, and are synchronized through drive shafts 60, 80, respectively, so that the movable piston 66 of the slide valve 40 is in the proper position during the intake and exhaust strokes of the pump 38. Of course, the linkage mechanisms may be operated manually, if desired.

In operation of the liquid dispenser of FIGURE 1, the galvanic cell container 10 supported on the movable platform 22 is positioned in liquid and air tight engagement with the gasket 20 at the bottom of the dispensing manifold 14. The vacuum chamber 16 is then evacuated through means of the conduit 28 and the solenoid valve 30, which is open, suitably by a vacuum pump, removing air from the chamber 16 and from the porous electrode unit 12 in the container 10. Once the chamber 16 is evacuated, the valve 30 is closed, the solenoid valve 46 in the conduit 26 is opened and the positive displacement pump 38 is actuated through its linkage mechanism as described above, with the slide valve 40 in the position shown in FIGURE 1. In this position of the slide valve 40, a predetermined and uniform amount or volume of liquid electrolyte fed from the tank 36 is drawn into the pump 38 as it approaches the top of its intake stroke. The slide valve 40 is then actuated and the piston 66 is moved to its other position, permitting the liquid electrolyte to be passed from the pump 38 during its exhaust stroke through the annular passage 74 in the slide valve 40 and through the conduit 26 to the distributing nozzle 24, from whence the liquid electrolyte is deposited onto the top of the porous electrode unit 12 in the container 10. To uniformly impregnate the porous electrode unit 12, air is introduced under pressure into the vacuum chamber 16 through the conduit 32 and the solenoid valve 34, which is opened. Of course, the solenoid valves 30 and 46 must be closed during this operation. Suitably, the solenoid valves may be actuated at the proper time during the dispensing and impregnating operation by an electromechanical device or manually through switch means, if desired.

FIGURE 2 shows a different arrangement of the liquid delivery system in which the positive displacement pump 38 is used in conjunction with check valves for controlling the flow of liquid electrolyte from the reservoir tank 36 and to the dispensing manifold 14. In this arrangement, check valves 82, 84 are disposed in the conduit 44 leading from the tank 36 and are arranged as shown by the arrows to prevent the flow of liquid electrolyte toward the tank 36 during the exhaust stroke of the pump 38. Similarly, check valves 86, 88 are disposed in the conduit 26 and are arranged to permit the flow of liquid electrolyte from the pump 38 and to the distributing nozzle 24, but to prevent flow of liquid under back pressure towards the pump 38 when air is introduced into the vacuum chamber 16.

In FIGURE 3, a different embodiment of the distributing nozzle is illustrated. Here, the distributing nozzle 90 incorporates a spring loaded ball check valve 92 which is arranged to permit the flow of liquid electrolyte under pressure from the pump 38 through the conduit 26. When air is introduced into the vacuum chamber 16 during the impregnation operation, back pressure into the conduit 26 is prevented by the check valve 92. Obviously, the distributing nozzle 90 eliminates the need for the separate solenoid valve 46 in the liquid dispenser of FIGURE 1.

Other embodiments of the distributing nozzle and valve means for use in the liquid dispenser of the invention are possible. For instance, in one embodiment illustrated in FIGURE 4, a straight distributing nozzle 94 and a pressure valve 96 in the conduit 26 may be used. The valve 96 includes a seal gasket 98 which is maintained in pressure contact against the open end of the conduit 100, leading to the distributing nozzle 94, by a conical spring 102. The liquid electrolyte from the pump 38 passing through the conduit 26 enters an annular cavity 104 below the seal gasket 98 and forces the gasket 98 upward into an open position, allowing the liquid electrolyte to flow to the distributing nozzle 94. When air is introduced into the vacuum chamber 16, back pressure into the conduit 26 is prevented by the seal gasket 98, which is then closed, and the spring 102.

In another embodiment illustrated in FIGURE 5, an apertured nozzle 106 is provided in the vacuum chamber 16 within a conduit 108 leading from the pump 38. A slide valve 110 is mounted in the conduit 108 and a spring 112 maintains the valve 110 in a normally closed position over the nozzle 106. When the liquid electrolyte is passed from the pump 38 through the conduit 108, the pressure exerted on the slide valve 110 and the spring 112 forces the valve 110 to move to an open position. In this arrangement, the conduit 28 and the solenoid valve 30 for evacuating the vacuum chamber 16 and the conduit 32 and solenoid valve 34 for introducing air into the chamber 16 communicates through a T branch 113 at the top of the dispensing manifold 14.

As indicated above, the liquid dispenser of the invention may utilize other types of liquid delivery systems for feeding the predetermined and uniform amount of liquid electrolyte to the dispensing manifold. One such system is illustrated in FIGURE 6. Here, an opened metered reservoir 114 is mounted at the top of the dispensing manifold 14 and communicates with the vacuum chamber 16 through a solenoid valve 116. The liquid electrolyte is supplied to the reservoir 114 through means of the conduit 118 from any convenient source, such as from the main reservoir 36. In operation, the solenoid valve 116 is opened at the proper time during the dispensing and impregnation operation as previously described, and the predetermined and uniform volume of liquid electrolyte contained in the metered reservoir 114 is allowed to pass into the vacuum chamber 16 and to the distributing nozzle 24 under atmospheric pressure. Desirably, the metered reservoir is constructed of a transparent material, such as vinyl plastic or the like, so that visual inspection of the liquid electrolyte therein is afforded.

The materials of which the liquid dispenser of the invention may be made will vary and depend upon the type of liquid to be dispensed. In the case where a non-corrosive liquid is involved, the liquid dispenser may be made of any convenient metal, for instance. However, where a corrosive liquid such as an alkaline electrolyte is dispensed, the dispenser should be made of corrosion resistant materials, for example, vinyl plastic, nickel or nickel plated steel.

I claim:

1. A liquid dispenser for dispensing a predetermined and uniformed amount of a liquid into a container and for uniformly impregnating a porous mass disposed in said container comprising, in combination: a dispensing manifold forming a vacuum chamber therein and having an open bottom end to which said container is mounted; a distributing nozzle disposed in said vacuum chamber and adapted to deposit said liquid onto the top of said porous mass in said container; means for evacuating said vacuum chamber and for introducing air under pressure into said vacuum chamber after said liquid has been deposited in order to force said liquid uniformly into said porous mass; and a liquid delivery system comprising a liquid reservoir, a positive displacement pump and a slide valve communicating with said pump and said distributing nozzle for feeding the liquid from said reservoir to said pump in one position thereof and for feeding the liquid from said pump to said distributing nozzle in another position thereof, said pump comprising a casing having a movable piston therein provided with a piston rod, and a linkage mechanism connected to said piston rod and including means for adjusting the piston stroke of said pump.

2. The liquid dispenser of claim 1 wherein said distributing nozzle incorporates valve means comprising a ball check valve loaded under spring pressure.

3. The liquid dispenser of claim 1 wherein said distributing nozzle comprises an aperture disposed in a conduit in said vacuum chamber and wherein a slide valve is positioned in said conduit and maintained in a normally closed position over said aperture by spring means.

References Cited

UNITED STATES PATENTS

| | | | |
|---|---|---|---|
| 960,920 | 6/1910 | Hill | 137—535 |
| 2,001,336 | 5/1935 | Vago et al. | 103—227 X |
| 2,578,024 | 12/1951 | Steinmayer et al. | 141—59 X |
| 2,614,742 | 10/1952 | Price | 141—59 X |
| 3,149,753 | 9/1964 | Forsyth | 222—380 X |

LAVERNE D. GEIGER, *Primary Examiner.*

H. S. BELL, *Assistant Examiner.*